United States Patent

Takada (10) Patent No.: US 12,415,536 B2
(45) Date of Patent: Sep. 16, 2025

(54) VEHICLE CONTROL METHOD AND VEHICLE CONTROL SYSTEM

(71) Applicant: TOYOTA JIDOSHA KABUSHIKI KAISHA, Toyota (JP)

(72) Inventor: Arata Takada, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 130 days.

(21) Appl. No.: 18/467,145

(22) Filed: Sep. 14, 2023

(65) Prior Publication Data

US 2024/0174249 A1    May 30, 2024

(30) Foreign Application Priority Data

Nov. 24, 2022  (JP) ................... 2022-187699

(51) Int. Cl.
*B60W 50/14* (2020.01)
*B60W 40/08* (2012.01)
*G06V 20/59* (2022.01)

(52) U.S. Cl.
CPC ........... *B60W 50/14* (2013.01); *B60W 40/08* (2013.01); *G06V 20/597* (2022.01); *B60W 2050/146* (2013.01); *B60W 2540/225* (2020.02); *B60W 2540/229* (2020.02)

(58) Field of Classification Search
CPC .............. B60W 50/14; B60W 40/08; B60W 2050/146; B60W 2540/225; B60W 2540/229; G06V 20/597
See application file for complete search history.

(56) References Cited

U.S. PATENT DOCUMENTS

| | | | |
|---|---|---|---|
| 10,732,627 B1* | 8/2020 | Roberson | G08G 1/162 |
| 11,136,042 B1* | 10/2021 | Fields | B60W 60/005 |
| 12,124,259 B2* | 10/2024 | Oba | G06F 3/017 |
| 2008/0183342 A1* | 7/2008 | Kaufmann | B60W 60/0061 701/1 |
| 2017/0261982 A1* | 9/2017 | Otaki | B60W 60/0053 |
| 2018/0141570 A1* | 5/2018 | Kimura | B60W 50/14 |
| 2019/0144002 A1* | 5/2019 | Okada | G05D 1/0088 340/425.5 |
| 2019/0286125 A1* | 9/2019 | Kawagoe | B60K 35/28 |
| 2020/0331458 A1 | 10/2020 | Nakamura et al. | |

FOREIGN PATENT DOCUMENTS

JP    2019-160081 A    9/2019
WO    2019/130552 A1   7/2019

* cited by examiner

*Primary Examiner* — Mohamed Barakat
(74) *Attorney, Agent, or Firm* — SoraIP, Inc.

(57) ABSTRACT

The vehicle includes a first visual device and a second visual device. The forward direction is a direction from the driver seat in which the driver of the vehicle is seated toward the front of the vehicle. The first direction is a direction from the driver seat toward the first visual device. The second direction is a direction from the driver seat toward the second visual device. The first angle between the first direction and the forward direction is greater than the second angle between the second direction and the forward direction. The vehicle control method includes: issuing a first visual notification from the first visual device when checking whether the driver is awake during autonomous driving of the vehicle; and determining that the driver is awake and continuing autonomous driving when the driver reacts to the first visual notification.

3 Claims, 6 Drawing Sheets

VEHICLE CONTROL METHOD AND VEHICLE CONTROL SYSTEM

CROSS-REFERENCE TO RELATED APPLICATION

This application claims priority to Japanese Patent Application No. 2022-187699 filed on Nov. 24, 2022, incorporated herein by reference in its entirety.

BACKGROUND

1. Technical Field

The present disclosure relates to a technique for checking whether a driver is awake during autonomous driving of a vehicle.

2. Description of Related Art

WO 2019/130552 discloses a vehicle control system. The vehicle control system estimates an arousal level of a driver who is on board a vehicle. When the arousal level decreases, the vehicle control system increases a load of the task required for the driver.

SUMMARY

Even during autonomous driving of the vehicle, the driver may be required to monitor a surrounding environment of the vehicle. Therefore, the system may check whether the driver is monitoring the surrounding environment of the vehicle. In other words, the system may check whether the driver is awake. For example, it is conceivable to request a driver to perform a task such as a switch operation so as to confirm that the driver is awake. However, when an excessive task is required for the driver, the driver may not be able to monitor the surrounding environment in the meantime. In addition, when an excessive task is required for the driver, the driver may not be able to perform an immediate driving operation (driving behavior) at once.

One object of the present disclosure is to provide a technique capable of appropriately checking whether a driver is awake during autonomous driving of a vehicle.

In one aspect, a technique for controlling a vehicle is provided.
The vehicle includes a first visual device and a second visual device. A forward direction is a direction toward a front of the vehicle from a driver seat in which a driver of the vehicle is seated. A first direction is a direction toward the first visual device from the driver seat. A second direction is a direction from the driver seat toward the second visual device. A first angle between the first direction and the forward direction is greater than a second angle between the second direction and the forward direction.
The vehicle control method includes issuing a first visual notification from the first visual device when whether the driver is awake is checked during autonomous driving of the vehicle, and determining that the driver is awake and continuing the autonomous driving of the vehicle when the driver reacts to the first visual notification.

In a driver awakening check process, the first visual notification is issued from the first visual device. Then, when the driver reacts to the first visual notification, the driver is determined to be awake. The reaction of the driver to the first visual notification is a change in line of sight or face orientation. Since the driver does not need to press the switch, monitoring of the surrounding environment by the driver is not hindered. Further, since the driver does not need to release driver's hand from the steering wheel, the driving operation of the driver at once is not hindered. These are preferable from the viewpoint of ensuring safety during autonomous driving.

Also, the first visual device that issues the first visual notification is relatively distant from the forward direction when viewed from the driver seat in which the driver is seated. Thus, the line of sight of the driver in response to the first visual notification is guided in a direction away from the forward direction. That is, the surrounding environment in a direction relatively away from the forward direction also enters the driver's field of view in response to the first visual notification. This means that monitoring of the surrounding environment by the driver is promoted. That is, in the driver awakening check process according to the present disclosure, it is possible to check whether the driver is awake, and at the same time, to actively guide the line of sight of the driver to the surrounding environment to promote monitoring of the surrounding environment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with reference to the accompanying drawings.

1. Advanced Vehicle Control System

Figure 1:
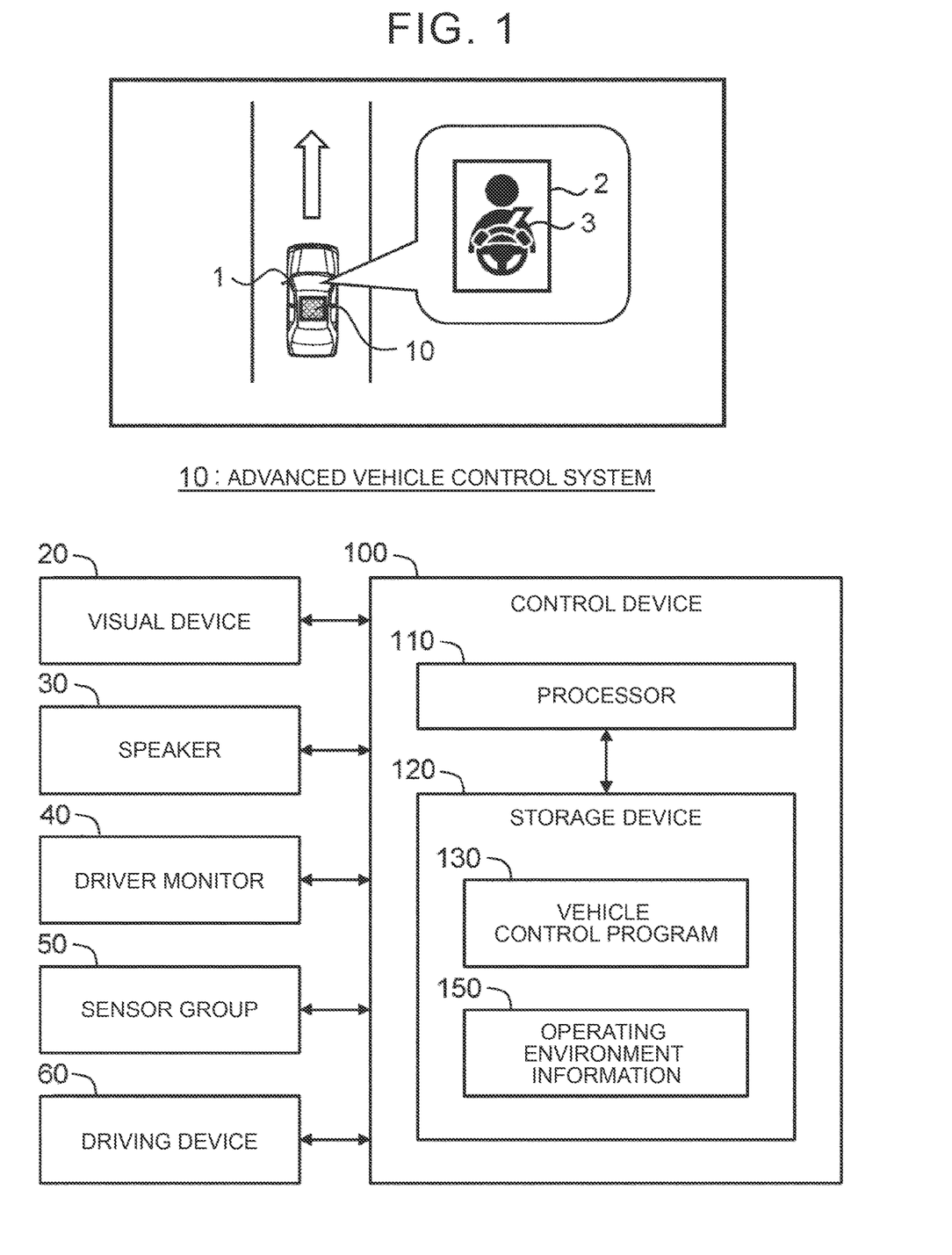
FIG. 1 is a diagram for explaining an outline of a vehicle and a vehicle control system according to an embodiment.

FIG. 1 is a diagram for explaining an outline of a vehicle 1 and a vehicle control system 10 according to the present embodiment. The vehicle 1 has an autonomous driving function. The autonomous driving function automatically performs at least one of steering, acceleration, and deceleration. As an example of the autonomous driving level, there is an example on the assumption that the driver does not necessarily have to concentrate on 100% driving (so-called level 3 or higher). The driver 3 is seated in the driver seat 2 of the vehicle 1. Even during autonomous driving, an operator seated in the driver seat 2 is referred to as a driver 3.

The vehicle control system 10 is mounted on the vehicle 1 and controls the vehicle 1. For example, the vehicle control system 10 controls autonomous driving of the vehicle 1.

Further, the vehicle control system 10 issues various notifications to the driver 3 seated in the driver seat 2.

For example, the vehicle control system 10 includes a visual device 20, a speaker 30, a driver monitor 40, a sensor group 50, a driving device 60, and a control device 100.

The visual device 20 provides a visual notification to the driver 3. Examples of the visual device 20 include a light-emitting device and a display panel. Examples of the light-emitting device include Light Emitting Diode (LED). Light emitting devices can provide (express) different information by emitting light in different colors. Examples of the display panel include a liquid crystal panel and an organic EL panel. Typically, the visual device 20 is installed in a room of the vehicle 1.

The speaker 30 issues an audio notification to the driver 3. Typically, the speaker 30 is installed in the interior of the vehicle 1.

The driver monitor 40 is a device for detecting the state and operation of the driver 3. For example, the driver monitor 40 includes a camera installed at a position where the driver 3 can be imaged. By analyzing the image obtained by the camera, it is possible to detect a face direction, a line of sight, an eye opening degree, an opening degree, and the like of the driver 3. The driver monitor 40 may include a steering touch sensor installed on a steering wheel operated by the driver 3. The driver monitor 40 may detect a driving operation by the driver 3.

The sensor group 50 includes a recognition sensor, a vehicle state sensor, a position sensor, and the like. The recognition sensor recognizes (detects) a situation around the vehicle 1. Examples of recognition sensors include cameras, Laser Imaging Detection and Ranging (LIDAR), radars, and the like. The vehicle state sensor detects a state of the vehicle 1. The vehicle state sensor includes a speed sensor, an acceleration sensor, a yaw rate sensor, a steering angle sensor, and the like. The position sensor detects a position and an azimuth of the vehicle 1. For example, the position sensor includes a Global Navigation Satellite System (GNSS).

The driving device 60 includes a steering device, a driving device, and a braking device. The steering device will turn the wheel. For example, the steering device includes an Electric Power Steering (EPS) device. The driving device is a power source that generates a driving force. Examples of the driving device include an engine, an electric motor, and an in-wheel motor. The braking device generates a braking force.

The control device 100 is a computer that controls the vehicle 1. The control device 100 includes one or more processors 110 (hereinafter simply referred to as processors 110) and one or more storage devices 120 (hereinafter simply referred to as storage devices 120). The processor 110 executes various processes. For example, the processor 110 includes a Central Processing Unit (CPU). The storage device 120 stores various types of information. Examples of the storage device 120 include volatile memory, non-volatile memory, Hard Disk Drive (HDD), Solid State Drive (SSD), and the like.

The vehicle control program 130 is a computer program executed by the processor 110. The function of the control device 100 is realized by the cooperation of the processor 110 executing the vehicle control program 130 and the storage device 120. The vehicle control program 130 is stored in the storage device 120. Alternatively, the vehicle control program 130 may be recorded in a computer-readable recording medium.

The control device 100 acquires the driving environment information 150 indicating the driving environment of the vehicle 1 by using the sensor group 50. The driving environment information 150 is stored in the storage device 120.

The driving environment information 150 includes surrounding situation information indicating a recognition result by the recognition sensor. For example, the surrounding situation information includes an image captured by the camera. The surrounding situation information may include object information about an object in the vicinity of the vehicle 1. Examples of objects around the vehicle 1 include pedestrians, other vehicles (preceding vehicles, parked vehicles, and the like), white lines, signals, signs, roadside structures, and the like. The object information indicates a relative position and a relative speed of the object with respect to the vehicle 1.

Further, the driving environment information 150 includes vehicle state information indicating a vehicle state detected by the vehicle state sensor.

Further, the driving environment information 150 includes vehicle position information indicating the position and the azimuth of the vehicle 1. The vehicle position information is obtained by a position sensor. Highly accurate vehicular position information may be acquired by a self-position estimation process (Localization) using map information and surrounding situation information (object information).

Further, the driving environment information 150 includes information obtained by the driver monitor 40.

The control device 100 executes vehicle travel control for controlling travel of the vehicle 1. The vehicle travel control includes steering control, drive control, and braking control. The control device 100 executes vehicle travel control by controlling the driving device 60 (steering device, drive device, and braking device).

Further, the control device 100 may perform autonomous driving control based on the driving environment information 150. For example, the control device 100 generates a travel plan of the vehicle 1 based on the driving environment information 150. Furthermore, the control device 100 generates a target trajectory necessary for the vehicle 1 to travel in accordance with the travel plan based on the driving environment information 150. The target trajectory includes a target position and a target speed. Then, the control device 100 performs vehicle travel control so that the vehicle 1 follows the target trajectory.

Furthermore, the control device 100 performs a "notification process" for issuing various types of notifications to the driver 3 as necessary. Hereinafter, the notification process will be described in detail.

2. Notification Processing

Figure 2:
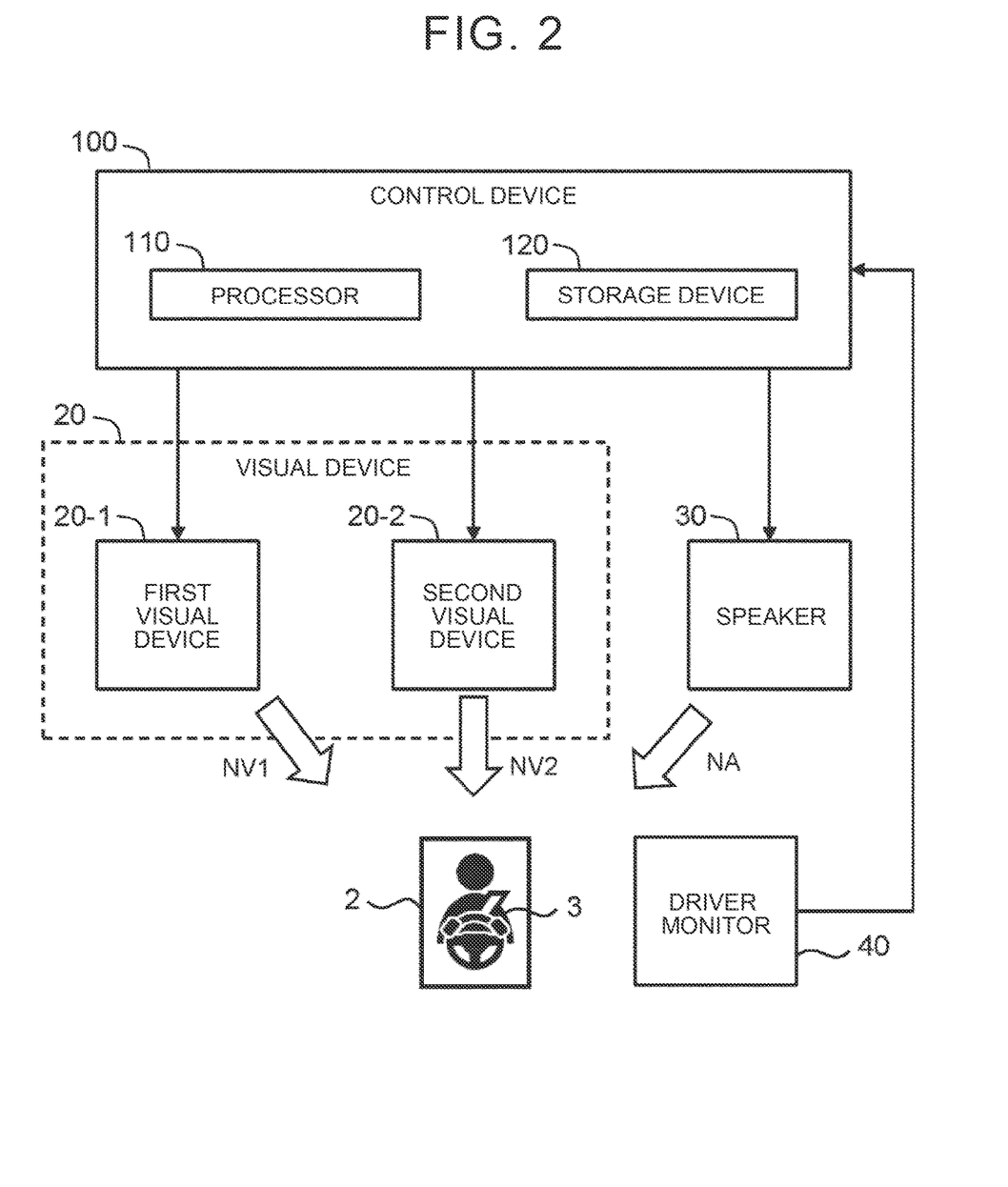
FIG. 2 is a block diagram illustrating a configuration related to a notification process according to the embodiment.

FIG. 2 is a block diagram illustrating a configuration related to a notification process. When a predetermined notification condition is satisfied, the control device 100 sends a notification to the driver 3.

For example, the notification condition is that it is necessary to check whether or not the driver 3 is awake during the autonomous driving of the vehicle 1. In other words, the notification condition is that it is necessary to check whether or not the driver 3 is monitoring the surrounding environment of the vehicle 1 during the autonomous driving of the vehicle 1. As another example, the notification condition is that the arousal level of the driver 3 falls below the threshold value. As yet another example, the notification condition is that the driver 3 needs to be required to grip the steering wheel during autonomous driving of the vehicle 1. As yet another example, the notification condition is that it is necessary to request the driver 3 to shift to the manual driving during the autonomous driving of the vehicle 1.

The types of notifications to the drivers 3 include "visual notification NV" and "audio notification NA". The visual notification NV is a notification based on visual information such as light emission, displaying, and the like. The audio notification NA is a notification based on voice data such as a voice message, a buzzer, and the like. The control device 100 may issue a visual notification NV through the visual device 20. In addition, the control device 100 can issue an audio notification NA through the speaker 30.

The vehicle control system 10 may include a plurality of visual devices 20. For example, the vehicle control system 10 includes a first visual device 20-1 and a second visual device 20-2. The first visual device 20-1 issues a first visual notification NV1 to the drivers 3. The second visual device 20-2 issues a second visual notification NV2 to the drivers 3.

Figure 3:
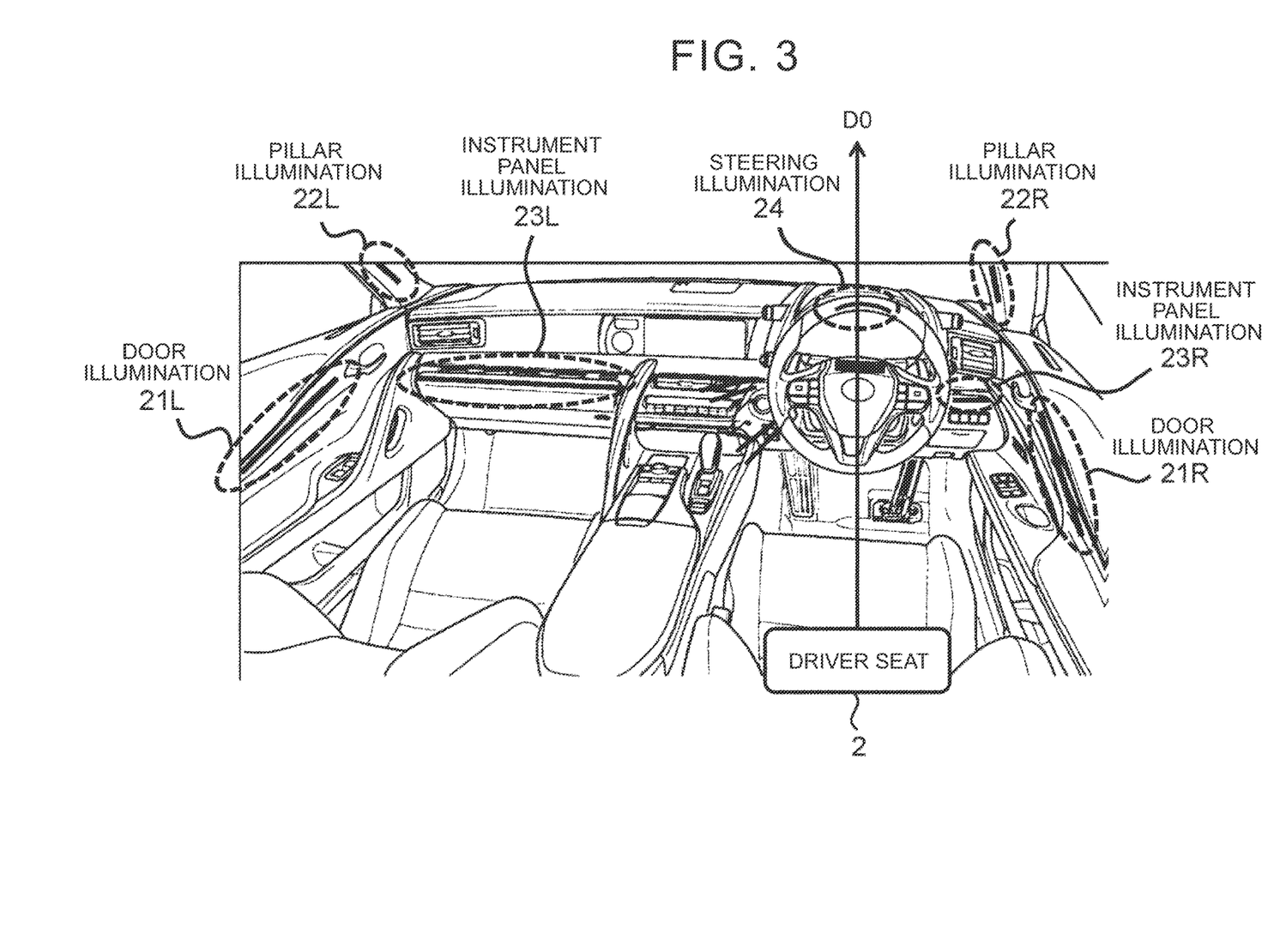
FIG. 3 is a diagram illustrating an example of a plurality of visual devices mounted on a vehicle according to the embodiment.

FIG. 3 shows an example of a plurality of visual devices 20 mounted on the vehicle 1. The plurality of visual devices 20 includes a door illumination 21 installed in a door, a pillar illumination 22 installed in a window frame, an instrument panel illumination 23 installed in an instrument panel, and a steering illumination 24 installed in a handle. The illumination is a light-emitting device including a plurality of LED. Each of the illuminations is arranged in a band shape.

The forward direction D0 is a direction from the driver seat 2 toward the front of the vehicle 1. In the embodiment illustrated in FIG. 3, the door illumination 21L, the pillar illumination 22L, and the instrument panel illumination 23L are disposed on the left side of the forward direction D0. On the other hand, the door illumination 21R, the pillar illumination 22R, and the instrument panel illumination 23R are disposed on the right side of the forward direction D0. The steering illumination 24 is located substantially in the forward direction D0.

Figure 4:
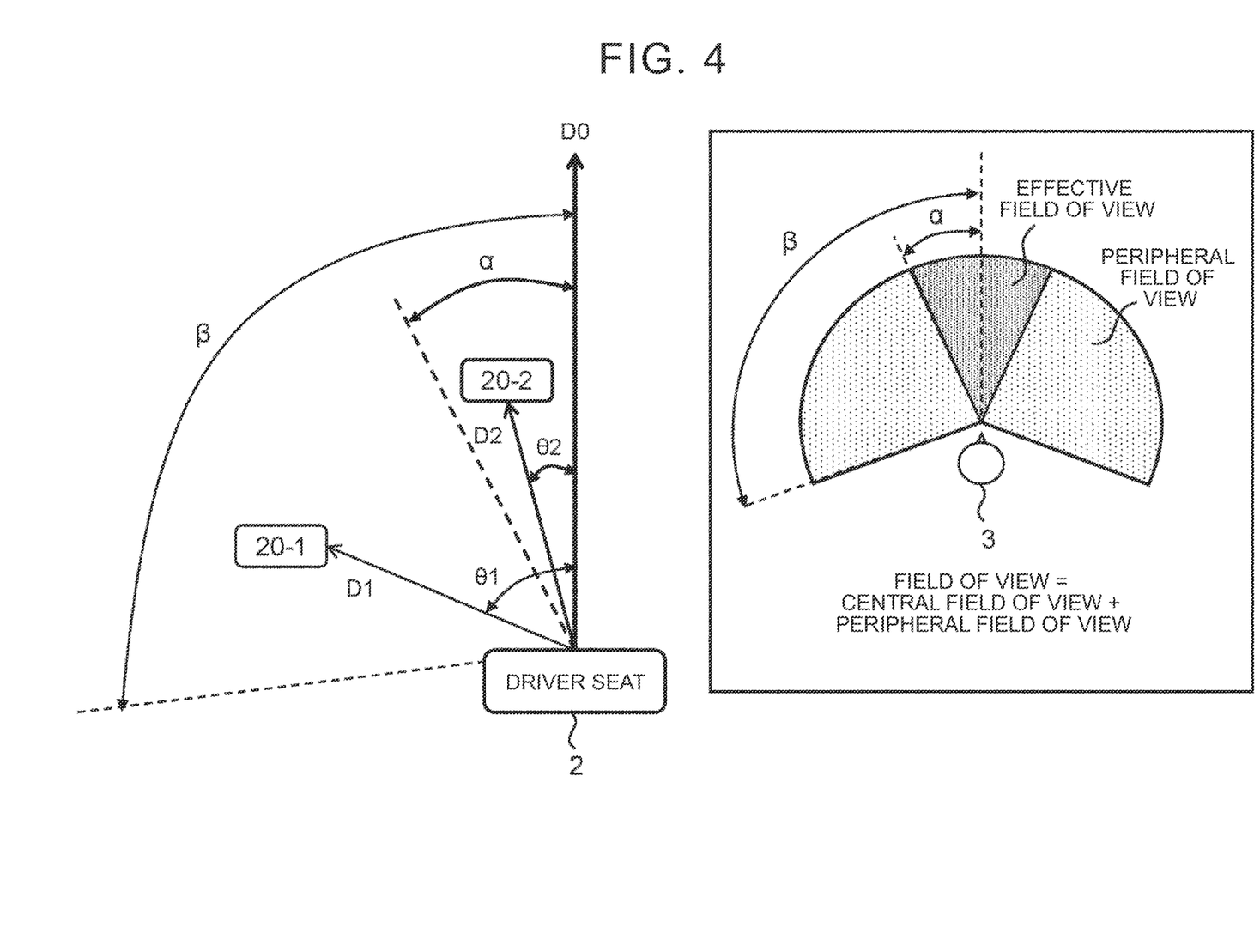
FIG. 4 is a conceptual diagram for explaining a positional relationship between the first visual device and the second visual device according to the embodiment.

FIG. 4 is a conceptual diagram for explaining the positional relationship between the first visual device 20-1 and the second visual device 20-2 according to the present embodiment. The forward direction D0 is a direction from the driver seat 2 toward the front of the vehicle 1. The first direction D1 is a direction from the driver seat 2 toward the first visual device 20-1. The second direction D2 is a direction from the driver seat 2 toward the second visual device 20-2. The first angle θ1 is an angle between the first direction D1 and the forward direction D0. The second angle θ2 is an angle between the second direction D2 and the forward direction D0. As shown in FIG. 4, the first angle θ1 is larger than the second angle θ2. Therefore, when the driver 3 seated in the driver seat 2 faces the front (forward direction D0), the first visual device 20-1 is far from the line-of-sight direction of the driver 3, and the second visual device 20-2 is close to the line-of-sight direction of the driver 3.

The human field of view is divided into an effective field of view (central field of view) and a peripheral field of view. A human can clearly perceive an object that is in an effective field of view. On the other hand, a person can perceive an object that is in the peripheral field of view in a blurred manner. Preferably, when the driver 3 seated in the driver seat 2 is facing the front (forward direction D0), the first visual device 20-1 is in the peripheral field of view of the driver 3 and the second visual device 20-2 is in the valid field of view (central field of view) of the driver 3.

Here, an angle of an average field of view of a person will be considered. The average angle of the field of view is an average value of the angles of the field of view of a certain number of people, and is generally known. For example, the average field of view of the human is about 100 degrees left and right (total 200 degrees), and the average effective visual field of the human is about 30 degrees left and right (total 60 degrees). The reference angle α is half (e.g., 30 degrees) of the angle of the average effective field of view of the human. The limit angle β is half of the angle of the average field of view of the human (e.g., 100 degrees). The first angle θ1 between the first direction D1 and the forward direction D0 may be greater than the reference angle α and less than the limiting angle β. The second angle θ2 between the second direction D2 and the forward direction D0 may be less than the reference angle α.

In the exemplary embodiment shown in FIG. 3, the door illumination 21L, the pillar illumination 22L, the instrument panel illumination 23L, and the door illumination 21R may belong to the first visual device 20-1. On the other hand, the steering illumination 24 may belong to the second visual device 20-2.

3. Driver Wakefulness Check Process

Even during autonomous driving of the vehicle 1, the driver 3 may be required to monitor the surrounding environment of the vehicle 1. Therefore, the vehicle control system 10 (the control device 100) may check whether or not the driver 3 is monitoring the surrounding environment of the vehicle 1. In other words, the vehicle control system 10 (the control device 100) may check whether or not the driver 3 is awake. This process is hereinafter referred to as "driver wake-up check process". The driver wake-up check is performed during the autonomous driving of the vehicle 1.

First, as a comparative example, a case where a switch operation is required for the driver 3 in the driver awakening check process will be considered. In this case, while the switch operation is performed, the driver 3 cannot monitor the surrounding environment, and the driver cannot immediately perform the driving operation. In this way, when an excessive task is required for the driver 3, there is a possibility that the driver 3 cannot monitor the surrounding environment in the meantime. In addition, when an excessive task is required for the driver 3, the driver 3 may not be able to perform a quick driving operation (driving behavior) at once.

Therefore, the present embodiment proposes a technique capable of more appropriately performing the driver wake-up check process during the autonomous driving of the vehicle 1.

Figure 5:
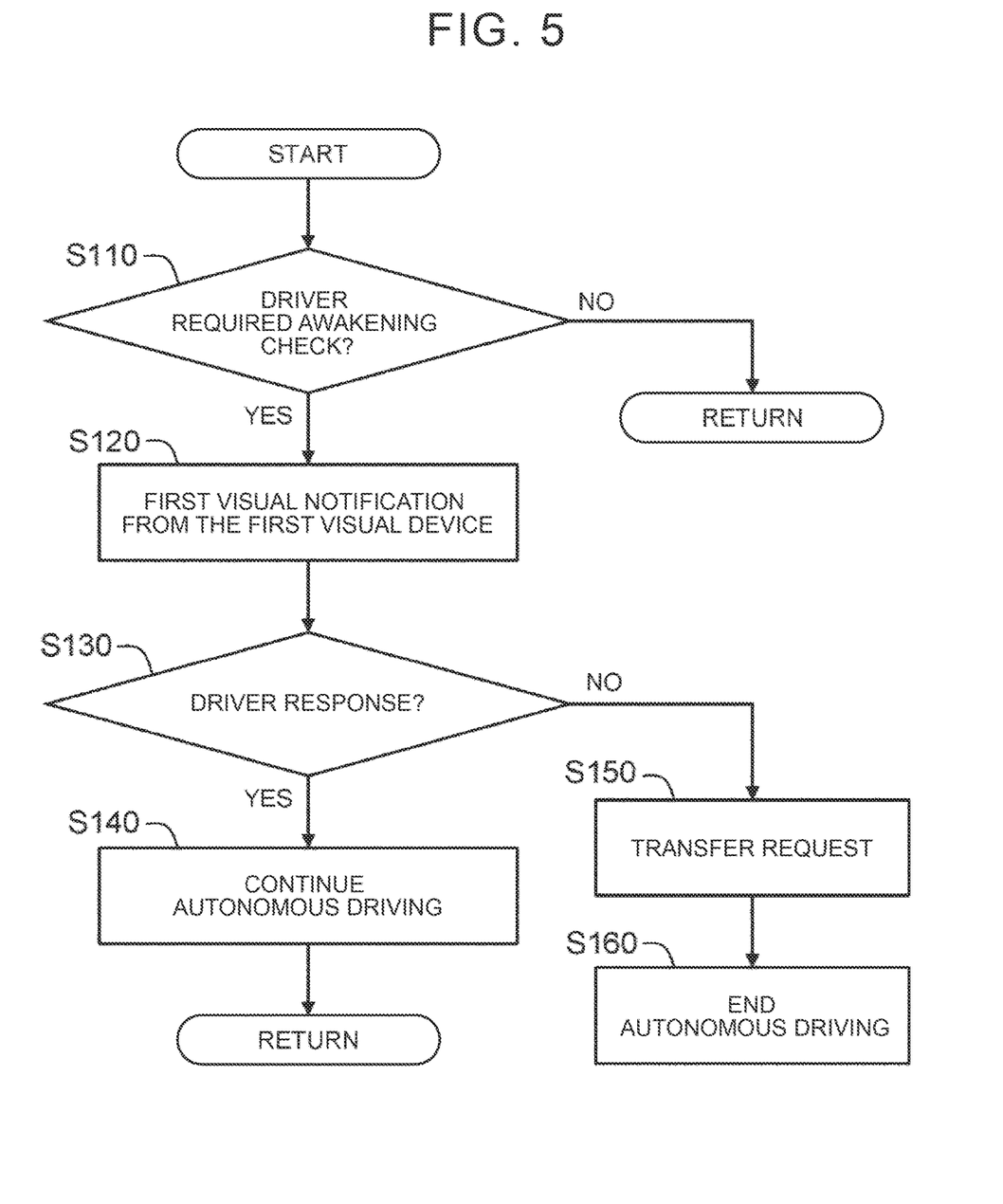
FIG. 5 is a flowchart illustrating a process related to the driver awakening check process according to the embodiment.

FIG. 5 is a flowchart illustrating a process related to the driver awakening check process according to the present embodiment.

3-1. S110

In S110, the control device 100 determines whether or not the driver-wake-up checking process is required. For example, the driver wake-up check process is periodically executed. Alternatively, the driver wake-up check process may be executed in response to a predetermined trigger. Examples of triggers include that the autonomous driving level is scheduled to decrease from level 3 to level 2, that lane changes are made, and the like. If the driver-wake-up checking process is required (S110; Yes), the process proceeds to S120.

Optionally, the control device 100 may consider whether the vehicle 1 is in a state suitable for the driver awakening check process. A situation suitable for the driver wakefulness check process is a situation in which the driver is relatively comfortable. For example, when the road width of the road on which the vehicle 1 is traveling is equal to or larger than the predetermined width, the execution of the driver wake-up check process may be permitted. As another example, when the curvature of the road on which the vehicle 1 is traveling is less than the predetermined value, the execution of the driver wake-up check process may be permitted. The width and curvature of the road are acquired based on the driving environment information 150 (surrounding situation information). Alternatively, the width and curvature of the road may be acquired based on the map information and the vehicle position information.

3-2. S120

Figure 6:
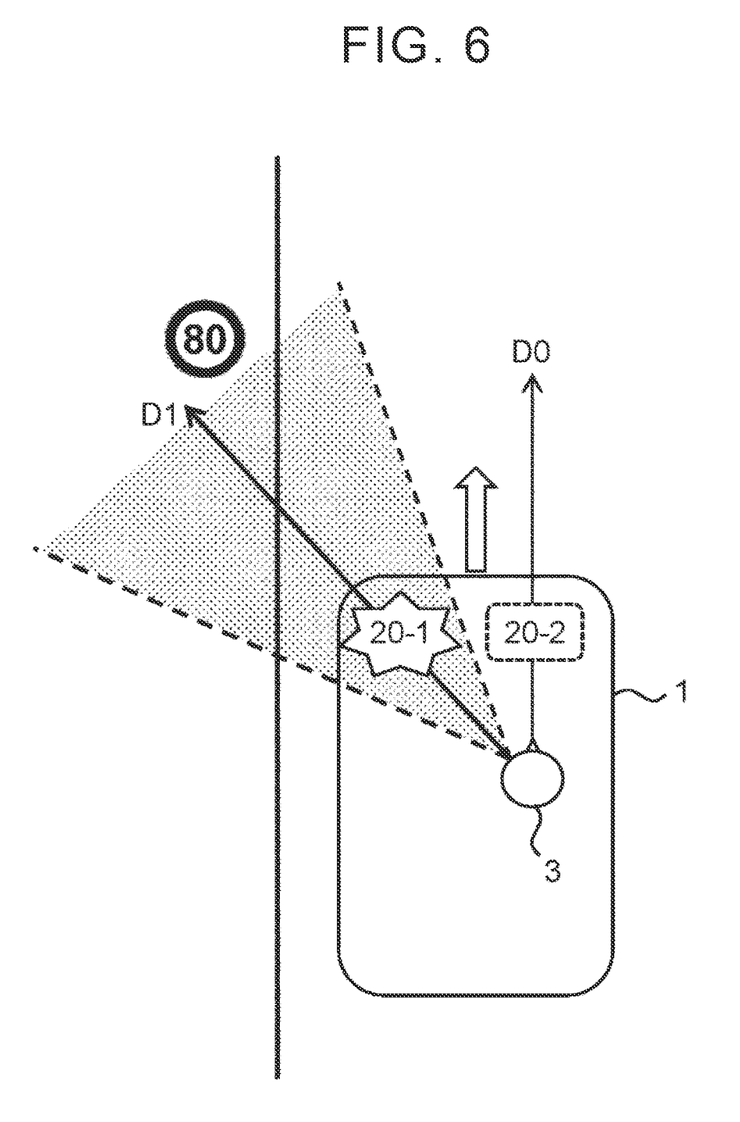
FIG. 6 is a conceptual diagram for explaining a driver awakening check process according to the embodiment.

FIG. 6 is a conceptual diagram for explaining S120. In S120, the control device 100 issues a first visual notification NV1 from at least the first visual device 20-1. For example, when the first visual device 20-1 is a light-emitting device, the control device 100 causes the first visual device 20-1 to emit light or blink for a certain period of time. In other words, the door illumination 21L, the pillar illumination 22L, the instrument panel illumination 23L, and the door illumination 21R may belong to the first visual device 20-1, as shown in FIG. 3.

The control device 100 may issue the first visual notification NV1 from the first visual device 20-1 without issuing the second visual notification NV2 from the second visual device 20-2. The control device 100 may issue the first visual notification NV1 from the first visual device 20-1 without issuing an audio notification NA from the speaker 30.

3-3. S130

In a S130 subsequent to S120, the control device 100 determines whether or not the drivers 3 react to the first visual notification NV1. For example, the response of the driver 3 is that the line of sight or facial orientation of the driver 3 approaches the first direction D1 to the first visual device 20-1. The response of the driver 3 may be that the line of sight or facial orientation of the driver 3 substantially matches the first direction D1 to the first visual device 20-1.

Whether or not the driver 3 reacts can be determined based on information obtained by the driver monitor 40. More specifically, the control device 100 detects a face direction and a line of sight of the driver 3 by analyzing an image obtained by the camera. Then, the control device 100 determines whether or not the driver 3 has responded to the first visual notification NV1 based on the facial orientation and line of sight of the driver 3.

If the driver 3 responds to the first visual notification NV1 within a certain period after S120 (S130; Yes), the process proceeds to S140. On the other hand, if the driver 3 does not respond to the first visual notification NV1 within a certain period after S120 (S130; No), the process proceeds to S150.

3-4. S140

In S140, the control device 100 determines that the driver 3 is awake. That is, the control device 100 determines that the driver 3 is monitoring the surrounding environment of the vehicle 1. In this case, the control device 100 continues the autonomous driving of the vehicle 1.

3-5. S150

In S150, the control device 100 determines that the driver 3 is not monitoring the surroundings of the vehicle 1. Here, the control device 100 may issue a Transition Demand. The shift request requests the driver 3 to shift to the manual driving. For example, the control device 100 issues a transition request from the visual device 20 and the speaker 30.

When the driver 3 starts manual driving, the autonomous driving of the vehicles 1 is ended (S160).

4. Effects

As described above, according to the present embodiment, the first visual notification NV1 is output from the first visual device 20-1 in the driver-wake-up checking process. When the driver 3 responds to the first visual notification NV1, it is determined that the driver 3 is awake. The response of the drivers 3 to the first visual notification NV1 is a change in line of sight or facial orientation. Since the driver 3 does not need to press the switch, monitoring of the surrounding environment by the driver 3 is not hindered. Further, since the driver 3 does not need to release his/her hand from the handle, the driver 3 does not disturb the quick driving operation (driving behavior). These are preferable from the viewpoint of ensuring safety during autonomous driving.

Further, the first visual device 20-1 for issuing the first visual notification NV1 is relatively distant from the forward direction D0 when viewed from the driver seat 2 where the driver 3 is seated. Thus, the line of sight of the drivers 3 in response to the first visual notification NV1 is guided in a direction away from the forward direction D0. That is, in the field of view of the drivers 3 in response to the first visual notification NV1, the surrounding environment in a direction relatively away from the forward direction D0 also enters. For example, in the field of view of the driver 3 in response to the first visual notification NV1, a road-side sign, a pedestrian, a structure having a blind spot, and the like are entered (see FIG. 6). This means that the monitoring of the surrounding environment by the driver 3 is promoted. In the driver awakening check process according to the present embodiment, it is possible to check whether or not the driver 3 is awake, and at the same time, to actively guide the line of sight of the driver 3 to the surrounding environment to promote the surrounding environment monitoring.

In the driver-wake-up checking process, the second visual device 20-2 close to the forward direction D0 may not be used. When the second visual device 20-2 is not used and only the first visual device 20-1 is used, the line of sight of the driver 3 can be more effectively guided in a direction away from the forward direction D0.

In the driver-wake-up checking process, the audio notification NA may not be issued from the speaker 30. The stimulus that the audio notification NA provides to the driver 3 is stronger than the stimulus that the visual notification NV provides to the driver 3. Due to the strong stimulus of the audio notification NA, the driver 3 may feel that the audio notification NA is excessive. That is, the drivers 3 may feel the audio notification NA troublesome. In addition, the audio notification NA is audible not only to the driver 3 but also to the passenger. Therefore, the passenger may also feel the audio notification NA troublesome. By not intentionally issuing such an audio notification NA, the troublesomeness felt by the drivers 3 and the passengers is suppressed.

What is claimed is:

1. A vehicle control method for controlling a vehicle, wherein
 the vehicle includes a first visual device and a second visual device,
 a forward direction is a direction toward a front of the vehicle from a driver seat in which a driver of the vehicle is seated,
 a first direction is a direction toward the first visual device from the driver seat, a second direction is a direction from the driver seat toward the second visual device, and a first angle between the first direction and the forward direction is greater than a second angle between the second direction and the forward direction, the vehicle control method comprising:

issuing a first visual notification from the first visual device, without issuing a visual notification from the second visual device, to check whether the driver is awake during autonomous driving of the vehicle, the driver being determined to be awake in a case where the driver reacts to the first visual notification; and continuing the autonomous driving of the vehicle upon determining that the driver is awake.

2. The vehicle control method according to claim 1, wherein:

a reference angle is half of an angle of an average effective field of view of a human being;

a limit angle is half of an angle of an average field of view of a human being; and the first angle between the first direction and the forward direction is greater than the reference angle and less than the limit angle.

3. A vehicle control system configured to control a vehicle, the vehicle control system comprising one or more processors, wherein the vehicle includes a first visual device and a second visual device, a forward direction is a direction toward a front of the vehicle from a driver seat in which a driver of the vehicle is seated, a first direction is a direction toward the first visual device from the driver seat, a second direction is a direction from the driver seat toward the second visual device, a first angle between the first direction and the forward direction is greater than a second angle between the second direction and the forward direction, and the one or more processors are configured to:

issue a first visual notification from the first visual device, without issuing a visual notification from the second visual device, to check whether the driver is awake during autonomous driving of the vehicle, the driver being determined to be awake in a case where the driver reacts to the first visual notification; and continue the autonomous driving of the vehicle upon determining that the driver is awake.

* * * * *